United States Patent
Maenishi et al.

(10) Patent No.: US 9,240,604 B2
(45) Date of Patent: Jan. 19, 2016

(54) HYDROGEN GENERATION APPARATUS AND FUEL CELL POWER GENERATION SYSTEM

(75) Inventors: Akira Maenishi, Shiga (JP); Yuji Mukai, Osaka (JP); Youji Kawaguchi, Kyoto (JP); Masataka Ozeki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 821 days.

(21) Appl. No.: 13/580,310

(22) PCT Filed: Mar. 2, 2011

(86) PCT No.: PCT/JP2011/001216
§ 371 (c)(1),
(2), (4) Date: Aug. 21, 2012

(87) PCT Pub. No.: WO2011/108264
PCT Pub. Date: Sep. 9, 2011

(65) Prior Publication Data
US 2012/0321971 A1 Dec. 20, 2012

(30) Foreign Application Priority Data
Mar. 4, 2010 (JP) .................................. 2010-047453

(51) Int. Cl.
*B01J 19/00* (2006.01)
*H01M 8/06* (2006.01)
*C01B 3/38* (2006.01)
*C01B 3/48* (2006.01)
*H01M 8/04* (2006.01)
*B01J 8/04* (2006.01)

(52) U.S. Cl.
CPC ............ *H01M 8/0612* (2013.01); *B01J 8/0469* (2013.01); *B01J 8/0492* (2013.01);
(Continued)

(58) Field of Classification Search
CPC combination set(s) only.
See application file for complete search history.

(56) References Cited

U.S. PATENT DOCUMENTS 6,083,425 A * 7/2000 Clawson et al. ............... 252/372
6,413,479 B1 * 7/2002 Kudo et al. .................... 422/198
(Continued)

FOREIGN PATENT DOCUMENTS

JP      2006-063193 A      3/2006
JP      2007-055892    *   3/2007
(Continued)

OTHER PUBLICATIONS

International Search Report mailed Jun. 7, 2011 issued in corresponding International Application No. PCT/JP2011/001216.
(Continued)

*Primary Examiner* — Kaity Handal
(74) *Attorney, Agent, or Firm* — McDermott Will & Emery LLP (57) ABSTRACT

A hydrogen generation apparatus 200 includes: an evaporating part 7; a reforming reaction part 9A connected to the downstream side of the evaporating part; a carbon monoxide reducing part 20 provided downstream from the reforming reaction part; and a gas guiding part 21 disposed between the reforming reaction part and the carbon monoxide reducing part and configured to guide a gas that has passed through the reforming reaction part to the carbon monoxide reducing part. The evaporating part and the carbon monoxide reducing part are arranged to be adjacent to each other such that, at least, a part of the evaporating part and a part of the carbon monoxide reducing part are heat exchangeable with each other. The evaporating part is configured such that a heat exchange amount at a portion of the evaporating part, the portion corresponding to the carbon monoxide reducing part, is less than a heat exchange amount at a portion of the evaporating part, the portion not corresponding to the carbon monoxide reducing part.

13 Claims, 7 Drawing Sheets

(52) U.S. Cl.
CPC .............. *B01J 8/0496* (2013.01); *C01B 3/384* (2013.01); *C01B 3/48* (2013.01); *H01M 8/04089* (2013.01); *H01M 8/0668* (2013.01); *B01J 2208/0053* (2013.01); *B01J 2208/00203* (2013.01); *B01J 2208/00221* (2013.01); *B01J 2208/00504* (2013.01); *C01B 2203/0233* (2013.01); *C01B 2203/0283* (2013.01); *C01B 2203/047* (2013.01); *C01B 2203/0811* (2013.01); *C01B 2203/1288* (2013.01); *Y02E 60/50* (2013.01)

(56) References Cited

U.S. PATENT DOCUMENTS

| | | | |
|---|---|---|---|
| 2002/0042035 A1* | 4/2002 | Komiya et al. | 431/268 |
| 2003/0161768 A1* | 8/2003 | Kawamoto et al. | 422/188 |
| 2004/0115494 A1 | 6/2004 | Tamura et al. | |
| 2004/0144029 A1 | 7/2004 | Miura et al. | |
| 2007/0151152 A1 | 7/2007 | Mukai et al. | |
| 2009/0087705 A1* | 4/2009 | Fuju et al. | 429/20 |
| 2009/0317671 A1 | 12/2009 | Ukai et al. | |
| 2010/0183928 A1* | 7/2010 | Fujihara et al. | 429/423 |
| 2011/0065011 A1 | 3/2011 | Maenishi et al. | |
| 2011/0114528 A1* | 5/2011 | Hirz | 206/509 |

FOREIGN PATENT DOCUMENTS

| | | |
|---|---|---|
| JP | 2008-063171 A | 3/2008 |
| JP | 2008-063193 A | 3/2008 |

OTHER PUBLICATIONS

International Preliminary Report on Patentability mailed Apr. 5, 2012 issued in corresponding International Application No. PCT/JP2011/001216.

* cited by examiner

HYDROGEN GENERATION APPARATUS AND FUEL CELL POWER GENERATION SYSTEM

RELATED APPLICATIONS

This application is the U.S. National Phase under 35 U.S.C. §371 of International Application No. PCT/JP2011/001216, filed on Mar. 2, 2011, which in turn claims the benefit of Japanese Application No. 2010-047453, filed on Mar. 4, 2010, the disclosures of which Applications are incorporated by reference herein.

TECHNICAL FIELD

The present invention relates to a hydrogen generation apparatus and a fuel cell power generation system.

BACKGROUND ART

In recent years, research and development on household fuel cell power generation systems are more accelerated, aiming at facilitating the spread of such fuel cell power generation systems and business creation in the industry.

One of the challenges to overcome in order to realize the above objective is to further improve the reliability of a fuel cell power generation system and its components. One of such components is, for example, a hydrogen generation apparatus. Accordingly, further improvement in the reliability of the hydrogen generation apparatus is also required.

For example, Patent Literature 1 indicated below discloses a hydrogen generation apparatus which is configured such that no great change in passage pressure loss occurs, and the configuration of the hydrogen generation apparatus is intended to allow water supply from a water supply device to be stabilized and thereby make it possible to generate hydrogen in a stable manner (see FIG. 1 of Patent Literature 1).

CITATION LIST

Patent Literature

PTL 1: Japanese Laid-Open Patent Application Publication No. 2008-063193.

SUMMARY OF INVENTION

Technical Problem

However, the inventors of the present invention have found that there is still room for improvements for the conventional technology including the above-described Patent Literature 1, from the viewpoint of obtaining further improved reliability (i.e., further stabilizing hydrogen generation and suppressing carbon monoxide production to a greater extent).

In view of the above, an object of the invention is to provide a highly reliable hydrogen generation apparatus capable of generating hydrogen more stably and reducing carbon monoxide production more assuredly, and to provide a highly reliable fuel cell power generation system including the hydrogen generation apparatus.

Solution to Problem

As a result of diligent studies by the inventors of the present invention regarding the aforementioned problems of conventional art, the inventors have found that, in terms of further reliability improvement, conventional hydrogen generation apparatuses including the one disclosed in Patent Literature 1 have problems as described below.

Specifically, conventional hydrogen generation apparatuses as exemplified by the one disclosed in Patent Literature 1 typically include, at the upstream side of a region for progressing a so-called reforming reaction (i.e., a reforming reaction region), a region for evaporating water which is a raw material for the reforming reaction (i.e., a water evaporation region), and also include, at the downstream side of the reforming reaction region, a region for progressing a so-called shift reaction (i.e., a shift reaction region) and a region for progressing a so-called selective oxidation reaction (i.e., a selective oxidation reaction region).

Figure 7:
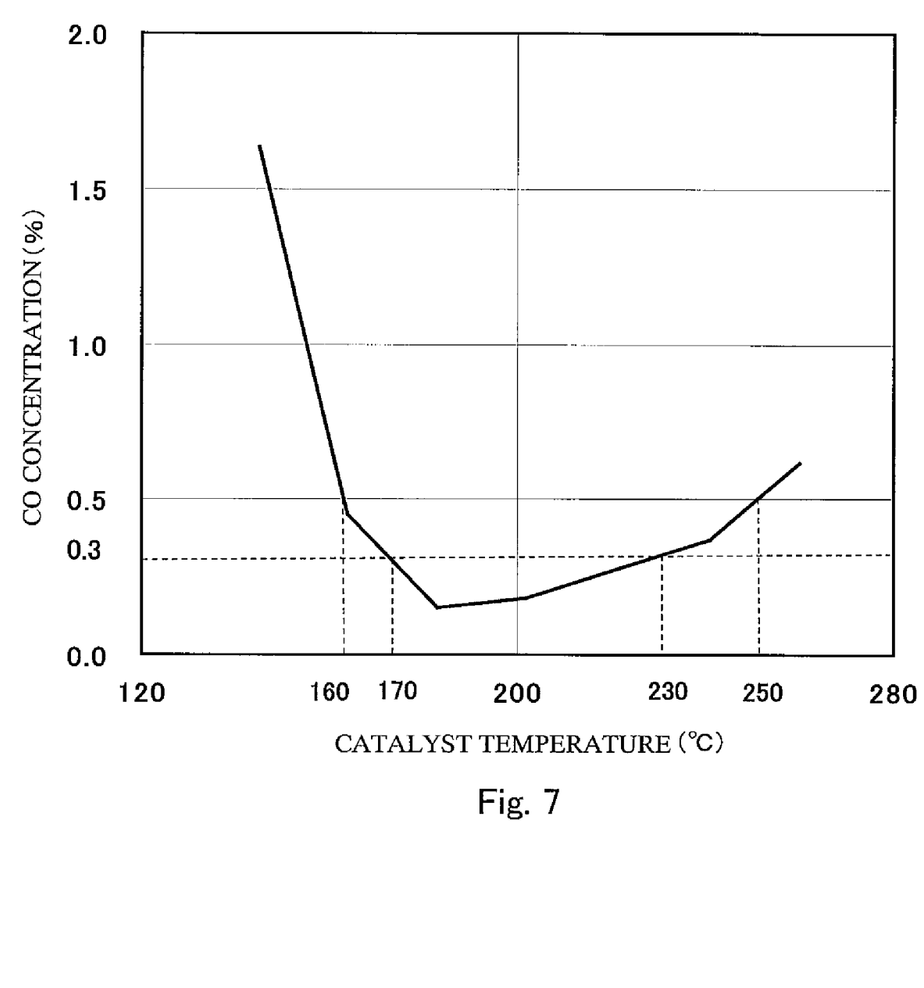
FIG. 7 is a characteristic diagram showing catalytic characteristics of a general shift conversion catalyst in relation to the temperature of the catalyst.

FIG. 7 is a characteristic diagram showing catalytic characteristics of a general shift conversion catalyst in relation to the temperature of the catalyst. The catalytic characteristics were measured by a method using a gas having a carbon monoxide concentration of 10%, which was intended as a gas having passed through a reforming catalyst. In the method, a carbon monoxide concentration in the gas was measured by gas chromatography after the gas had passed through the shift conversion catalyst. It is understood from FIG. 7 that the catalytic characteristics degrade in both a case where the catalyst temperature is high and a case where the catalyst temperature is low. In order to optimize the catalytic characteristics, it is necessary that the temperature distribution of the overall catalyst is as uniform as possible and is in a suitable temperature range. In the example of FIG. 7, if the catalyst temperature is in a range from 160° C. to 250° C., the carbon monoxide concentration is 0.5% or lower. If the range of the catalyst temperature is made narrower such as a range from 170° C. to 230° C., then the carbon monoxide concentration becomes 0.3% or lower, and thus more favorable catalytic characteristics can be obtained and the catalyst performance can be stabilized.

Generally speaking, also in the case of selective oxidation catalysts, the catalysts exhibit low oxidation activity and cannot sufficiently remove carbon monoxide in a low temperature range, and similarly, the catalysts cannot sufficiently remove carbon monoxide in a high temperature range due to influences of a decrease in selectivity and side reactions such as a reverse shift reaction.

Here, as shown in FIG. 1 of Patent Literature 1, a conventional hydrogen generation apparatus is configured, for example, such that the water evaporation region and the selective oxidation reaction region can exchange heat with each other. In such a configuration, heat is taken from the selective oxidation reaction region due to water evaporation in the water evaporation region. If heat is taken from the selective oxidation reaction region by an amount that exceeds a designed range, then there is a risk that the temperature of the selective oxidation reaction region cannot be maintained within a suitable range that allows the selective oxidation reaction to progress sufficiently.

In particular, in a case where a fuel cell power generation system is required to output high power, a large amount of water is supplied to the hydrogen generation apparatus in order to generate a large amount of hydrogen. This increases a risk of becoming unable to maintain the temperature of the selective oxidation reaction region within the aforementioned temperature range.

There is also a case where the shift reaction region and the water evaporation region are configured such that they can exchange heat with each other. Also in this case, there is a risk that the temperature of the shift reaction region cannot be maintained within a suitable range, as with the case of the selective oxidation reaction region.

Assume a case of adopting a configuration in which: a heat exchange amount at a portion of an evaporating part, the portion corresponding to a carbon monoxide reducing part, is less than a heat exchange amount at a portion of the evaporating part, the portion not corresponding to the carbon monoxide reducing part. With this configuration, heat taken from the carbon monoxide reducing part due to water evaporation in the evaporating part is reduced, which allows the temperature of the carbon monoxide reducing part to be easily maintained within a suitable range.

Specifically, in order to solve the above-described conventional problems, a hydrogen generation apparatus according to the invention includes: an evaporating part configured to evaporate water of a fluid that contains a raw material gas and the water to transform the water into steam, the raw material gas and the water being raw materials for hydrogen; a reforming reaction part connected to a downstream side of the evaporating part and configured to be supplied from the evaporating part with a fluid containing the raw material gas and the steam, the reforming reaction part including a reforming reaction catalyst which causes a reforming reaction to progress between the raw material gas and the steam contained in the fluid; a carbon monoxide reducing part provided downstream from the reforming reaction part and including at least one of a shift reactor and a selective oxidation reactor, the shift reactor including a shift reaction catalyst which causes a shift reaction to progress between carbon monoxide and water, the selective oxidation reactor causing a selective oxidation reaction to progress between carbon monoxide and oxygen; and a gas guiding part disposed between the reforming reaction part and the carbon monoxide reducing part and configured to guide a gas that has passed through the reforming reaction part to the carbon monoxide reducing part. The evaporating part and the carbon monoxide reducing part are arranged to be adjacent to each other such that, at least, a part of the evaporating part and a part of the carbon monoxide reducing part are heat exchangeable with each other. The evaporating part is configured such that a heat exchange amount at a portion of the evaporating part, the portion corresponding to the carbon monoxide reducing part, is less than a heat exchange amount at a portion of the evaporating part, the portion not corresponding to the carbon monoxide reducing part.

According to the above configuration, the amount of heat taken from the carbon monoxide reducing part due to water evaporation in the evaporating part can be reduced. This makes it possible to provide a highly reliable hydrogen generation apparatus capable of generating hydrogen more stably and reducing carbon monoxide production more assuredly.

A fuel cell power generation system according to the present invention includes the above-described hydrogen generation apparatus and a fuel cell. Such a configuration makes it possible to provide a highly reliable fuel cell power generation system.

Advantageous Effects of Invention

The present invention makes it possible to provide a highly reliable hydrogen generation apparatus and a highly reliable fuel cell power generation system that are capable of generating hydrogen more stably and reducing carbon monoxide production more assuredly.

BRIEF DESCRIPTION OF DRAWINGS

FIG. 5A shows Variation 3 and FIG. 5B shows Variation 4.

DESCRIPTION OF EMBODIMENTS

A hydrogen generation apparatus according to a first aspect of the present invention includes: an evaporating part configured to evaporate water of a fluid that contains a raw material gas and the water to transform the water into steam, the raw material gas and the water being raw materials for hydrogen; a reforming reaction part connected to a downstream side of the evaporating part and configured to be supplied from the evaporating part with a fluid containing the raw material gas and the steam, the reforming reaction part including a reforming reaction catalyst which causes a reforming reaction to progress between the raw material gas and the steam contained in the fluid; a carbon monoxide reducing part provided downstream from the reforming reaction part and including at least one of a shift reactor and a selective oxidation reactor, the shift reactor including a shift reaction catalyst which causes a shift reaction to progress between carbon monoxide and water, the selective oxidation reactor causing a selective oxidation reaction to progress between carbon monoxide and oxygen; and a gas guiding part disposed between the reforming reaction part and the carbon monoxide reducing part and configured to guide a gas that has passed through the reforming reaction part to the carbon monoxide reducing part. The evaporating part and the carbon monoxide reducing part are arranged to be adjacent to each other such that, at least, a part of the evaporating part and a part of the carbon monoxide reducing part are heat exchangeable with each other. The evaporating part is configured such that a heat exchange amount at a portion of the evaporating part, the portion corresponding to the carbon monoxide reducing part, is less than a heat exchange amount at a portion of the evaporating part, the portion not corresponding to the carbon monoxide reducing part.

The above configuration makes it possible to provide a highly reliable hydrogen generation apparatus capable of generating hydrogen more stably and reducing carbon monoxide production more assuredly.

A hydrogen generation apparatus according to a second aspect of the present invention is configured such that, particularly, the hydrogen generation apparatus according to the first aspect further includes: a first cylinder with a first bottom face formed at one end of the first cylinder; a second cylinder formed at an outer side of the first cylinder; a third cylinder with a third bottom face, the third cylinder being formed at an outer side of the second cylinder; a raw material supply unit configured to supply the raw material gas to first space which is space formed between a side wall of the first cylinder and a side wall of the second cylinder; a water supply unit configured to supply the water to the first space; a burner, formed within the first cylinder, configured to be supplied with a combustible gas and combustion air and to perform combustion; and a flue gas passage, formed at an inner side of the first cylinder, through which a flue gas from the burner flows. The evaporating part is formed in the first space, and is configured to transform the water into steam by absorbing heat from the flue gas. The reforming reaction part is disposed in the first space at a position downstream from the evaporating part. The carbon monoxide reducing part is disposed in second space formed between the side wall of the second cylinder and a side wall of the third cylinder. The gas guiding part is configured to cause the reformed gas from the first space to turn around at a position between the first bottom face and the third bottom face, and to supply the reformed gas to the second space. Of the evaporating part, the portion corresponding to the carbon monoxide reducing part is a first evaporating portion formed between the carbon monoxide reducing part and the first cylinder. The heat exchange amount is an amount of heat exchanged between the evaporating part and the water supplied from the water supply unit.

A hydrogen generation apparatus according to a third aspect of the present invention is configured such that, particularly, in the hydrogen generation apparatus according to the second aspect, the evaporating part includes a water passage which is formed by partitioning by a passage component, and a distance between adjacent portions of the passage component is greater in the first evaporating portion than in other portions different from the first evaporating portion.

A hydrogen generation apparatus according to a fourth aspect of the present invention is configured such that, particularly, in the hydrogen generation apparatus according to the second aspect, the evaporating part includes a water passage which is formed by partitioning by a passage component, and the water passage has a greater cross section in the first evaporating portion than in other portions different from the first evaporating portion.

A hydrogen generation apparatus according to a fifth aspect of the present invention is configured such that, particularly, in the hydrogen generation apparatus according to any one of the second to fourth aspects, the evaporating part includes the first evaporating portion, a second evaporating portion formed upstream from the first evaporating portion, and a third evaporating portion formed downstream from the first evaporating portion. The evaporating part is configured such that the heat exchange amount decreases in the following order: the heat exchange amount at the second evaporating portion; the heat exchange amount at the third evaporating portion; and the heat exchange amount at the first evaporating portion.

A hydrogen generation apparatus according to a sixth aspect of the present invention is configured such that, particularly, in the hydrogen generation apparatus according to the fifth aspect, the evaporating part includes a water passage which is formed by partitioning by a passage component, and a distance between adjacent portions of the passage component increases in the following order: the distance in the second evaporating portion; the distance in the third evaporating portion; and the distance in the first evaporating portion.

A hydrogen generation apparatus according to a seventh aspect of the present invention is configured such that, particularly, in the hydrogen generation apparatus according to any one of the second to sixth aspects, the carbon monoxide reducing part includes: a shift conversion catalyst layer formed at an upstream side of the carbon monoxide reducing part; and a selective oxidation catalyst layer formed at a downstream side of the carbon monoxide reducing part. The first evaporating portion includes: a fourth evaporating portion formed between the selective oxidation catalyst layer and the first cylinder; a sixth evaporating portion formed between the shift conversion catalyst layer and the first cylinder; and a fifth evaporating portion formed between the upstream evaporating portion and the downstream evaporating portion. The first evaporating portion is configured such that the heat exchange amount is less at the fourth evaporating portion and the sixth evaporating portion than at the fifth evaporating portion.

A hydrogen generation apparatus according to an eighth aspect of the present invention is configured such that, particularly, in the hydrogen generation apparatus according to the seventh aspect, the evaporating part includes a water passage which is formed by partitioning by a passage component, and a distance between adjacent portions of the passage component is greater in the fourth evaporating portion and the sixth evaporating portion than in the fifth evaporating portion.

A hydrogen generation apparatus according to a ninth aspect of the present invention is configured such that, particularly, in the hydrogen generation apparatus according to the seventh aspect or the eighth aspect, the evaporating part includes the first evaporating portion, a second evaporating portion formed upstream from the first evaporating portion, and a third evaporating portion formed downstream from the first evaporating portion. The evaporating part is configured such that the heat exchange amount decreases in the following order: the heat exchange amount at the second evaporating portion; the heat exchange amount at the third evaporating portion; the heat exchange amount at the fifth evaporating portion; the heat exchange amount at the fourth evaporating portion; and the heat exchange amount at the sixth evaporating portion.

A hydrogen generation apparatus according to a tenth aspect of the present invention is configured such that, particularly, in the hydrogen generation apparatus according to any one of the second to seventh aspects, the evaporating part includes a water passage which is formed by partitioning by a passage component, and the passage component is not disposed in the first evaporating portion.

A hydrogen generation apparatus according to an eleventh aspect of the present invention is configured such that, particularly, in the hydrogen generation apparatus according to any one of the third, fourth, sixth, eighth, and tenth aspects, the passage component is sandwiched between the first cylinder and the second cylinder, and is a spiral rod-like member.

A hydrogen generation apparatus according to a twelfth aspect of the present invention is configured such that, particularly, in the hydrogen generation apparatus according to any one of the third, fourth, sixth, eighth, tenth, and eleventh aspects, the passage component is formed of a metal with a round cross section.

A fuel cell power generation system according to a thirteenth aspect of the present invention includes: the hydrogen generation apparatus according to any one of the first to twelfth aspects; and a fuel cell.

The above configuration makes it possible to provide a highly reliable fuel cell power generation system capable of generating hydrogen more stably and reducing carbon monoxide production more assuredly.

Hereinafter, embodiments of the present invention are described with reference to the drawings. It should be noted that the present invention is not limited by these embodiments. Reference signs are given for illustratively indicating correspondence between the embodiments and the present invention, and do not mean that the configurations of the present invention are limited to the embodiments and the drawings corresponding thereto.

Embodiment 1

Figure 1:
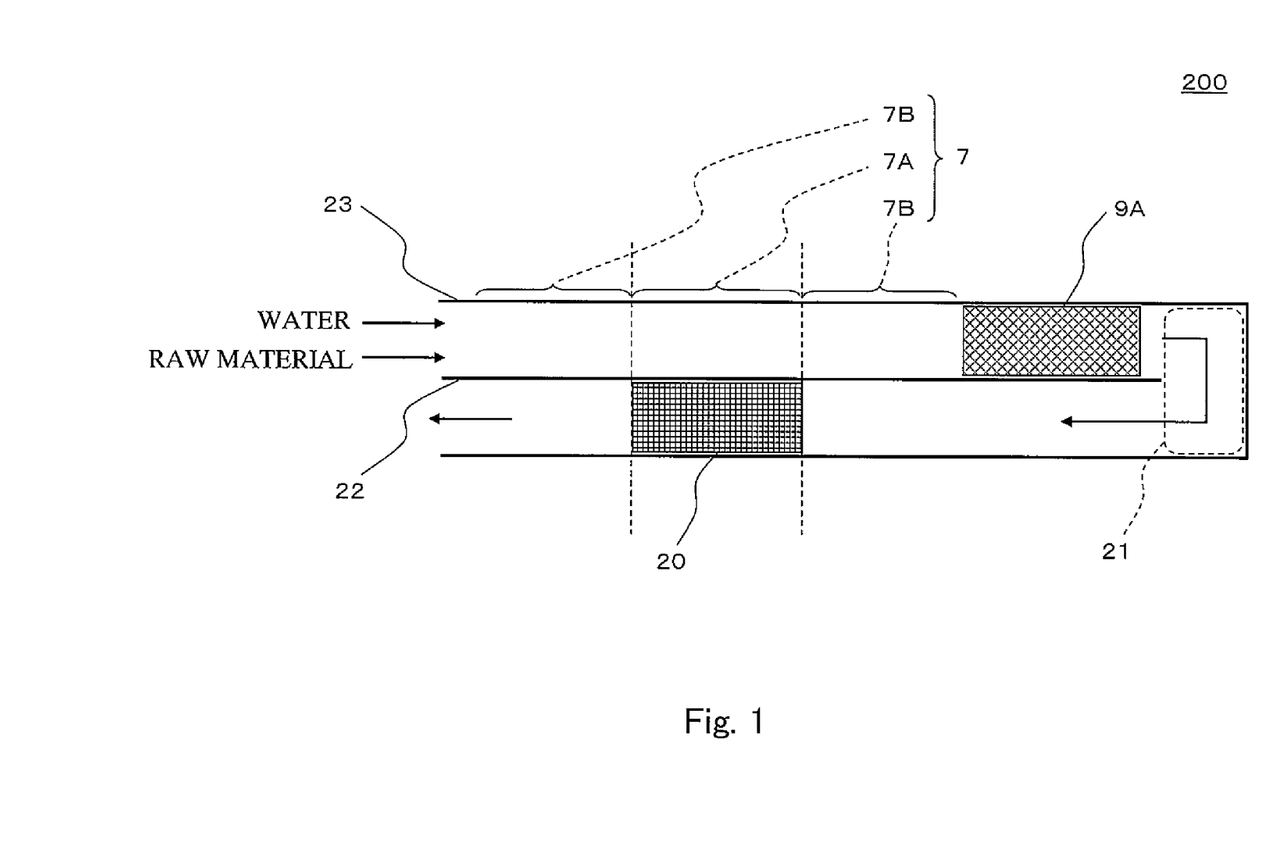
FIG. 1 is a conceptual diagram showing an example of a schematic configuration of a hydrogen generation apparatus according to Embodiment 1.

FIG. 1 is a conceptual diagram showing an example of a schematic configuration of a hydrogen generation apparatus according to Embodiment 1.

As shown in FIG. 1, a hydrogen generation apparatus 200 according to the present embodiment includes: an evaporating part 7; a reforming reaction part 9A connected to the downstream side of the evaporating part 7; a carbon monoxide reducing part 20 provided downstream from the reforming reaction part 9A; and a gas guiding part 21 disposed between the reforming reaction part 9A and the carbon monoxide reducing part 20. The evaporating part 7 and the carbon monoxide reducing part 20 are arranged to be adjacent to each other such that, at least, a part of the evaporating part 7 and a part of the carbon monoxide reducing part 20 can exchange heat with each other. The evaporating part 7 is configured such that a heat exchange amount at a portion 7A which corresponds to the carbon monoxide reducing part is less than a heat exchange amount at a portion 7B which does not correspond to the carbon monoxide reducing part.

The evaporating part 7 evaporates water of a fluid that contains a raw material gas and the water to transform the water into steam, the raw material gas and the water being raw materials for hydrogen.

The reforming reaction part 9A is supplied from the evaporating part 7 with a fluid containing the raw material gas and the steam, the reforming reaction part 9A including a reforming reaction catalyst which causes a reforming reaction to progress between the raw material gas and the steam contained in the fluid. Through the reforming reaction, a hydrogen-containing gas is generated. The hydrogen-containing gas contains carbon monoxide. In order for the reforming reaction to occur, the reforming reaction catalyst needs to be kept at a high temperature (e.g., 600 to 700 degrees Celsius). This heat may be supplied by, for example, a burner disposed above or below the hydrogen generation apparatus 200.

The carbon monoxide reducing part 20 includes at least one of a shift reactor and a selective oxidation reactor, the shift reactor including a shift reaction catalyst which causes a shift reaction to progress between carbon monoxide and water, the selective oxidation reactor causing a selective oxidation reaction to progress between carbon monoxide and oxygen. The carbon monoxide reducing part 20 serves to reduce the carbon monoxide concentration in the hydrogen-containing gas.

The shift reaction is an exothermic reaction represented by $CO+H_2O \rightarrow CO_2+H_2$. For example, a CU—Zn based catalyst, a Fe—Cr based catalyst, or a Pt-based catalyst can be used as the shift reaction catalyst. The number of shift reactors to be included is not necessarily one. A plurality of shift reactors may be included.

The selective oxidation reaction is an exothermic reaction represented by $2CO+O_2 \rightarrow 2CO_2$. A noble metal catalyst such as Pt or Ru can be used as a selective oxidation catalyst. The number of selective oxidation reactors to be included is not necessarily one. A plurality of selective oxidation reactors may be included.

The gas guiding part 21 guides a gas that has passed through the reforming reaction part to the carbon monoxide reducing part.

The evaporating part 7 and the carbon monoxide reducing part 20 are partitioned by a partition wall 22. The evaporating part 7 uses heat supplied from its surroundings, thereby evaporating water. For example, the heat is supplied to the evaporating part 7 from the burner disposed above the hydrogen generation apparatus 200 via a partition wall 23, and the heat is supplied to the evaporating part 7 also from the carbon monoxide reducing part 20 via the partition wall 22. The carbon monoxide reducing part 20 is heated by a gas discharged from the reforming reaction part 9A. For example, the gas is heated, via the partition wall 23, by the burner disposed above the hydrogen generation apparatus 200. In this case, it can be said that the burner heats the evaporating part 7 directly via the partition wall 23, and also that the burner heats the evaporating part 7 indirectly via the carbon monoxide reducing part 20 and the partition wall 22 while using the gas as a heating medium.

The portion 7A, which corresponds to the carbon monoxide reducing part 20, is adjacent to the carbon monoxide reducing part 20 with the partition wall 22 interposed between them. The portion 7A corresponding to the carbon monoxide reducing part 20, and the carbon monoxide reducing part 20, are configured such that they can exchange heat with each other.

In the present embodiment, the above description, "a heat exchange amount at a portion 7A which corresponds to the carbon monoxide reducing part is less than a heat exchange amount at a portion 7B which does not correspond to the carbon monoxide reducing part", means that the carbon monoxide reducing part 20 is less easily cooled down by the evaporating part 7 as compared to a conventional configuration. One such example is that the amount of heat received by water passing through the portion 7B of the evaporating part 7, which portion does not correspond to the carbon monoxide reducing part, is greater than the amount of heat received by water passing through the portion 7A of the evaporating part 7, which portion corresponds to the carbon monoxide reducing part. More specific examples include the following configurations: a configuration in which the flow rate of water flowing horizontally in FIG. 1 is higher in the portion 7A which corresponds to the carbon monoxide reducing part than in the portion 7B which does not correspond to the carbon monoxide reducing part; and a configuration in which the partition wall 22 of the portion 7A which corresponds to the carbon monoxide reducing part is thicker than the partition wall 22 of the portion 7B which does not correspond to the carbon monoxide reducing part, such that the amount of heat transferred from a passage downstream of the reforming reaction part 9A via the partition wall 22 to the portion 7A which corresponds to the carbon monoxide reducing part is less than the amount of heat transferred from the passage downstream of the reforming reaction part 9A via the partition wall 22 to the portion 7B which does not correspond to the carbon monoxide reducing part.

According to such configurations as described above, even if, for example, the amount of hydrogen to be generated by the hydrogen generation apparatus 200 is changed and thereby the water flow rate is changed, heat is not easily taken from the carbon monoxide reducing part 20 by the water and the temperature of the carbon monoxide reducing part 20 is stabilized. Thus, with these configurations, a highly reliable hydrogen generation apparatus can be provided, which is capable of generating hydrogen more stably and reducing carbon monoxide production more assuredly.

Embodiment 2

Figure 2:
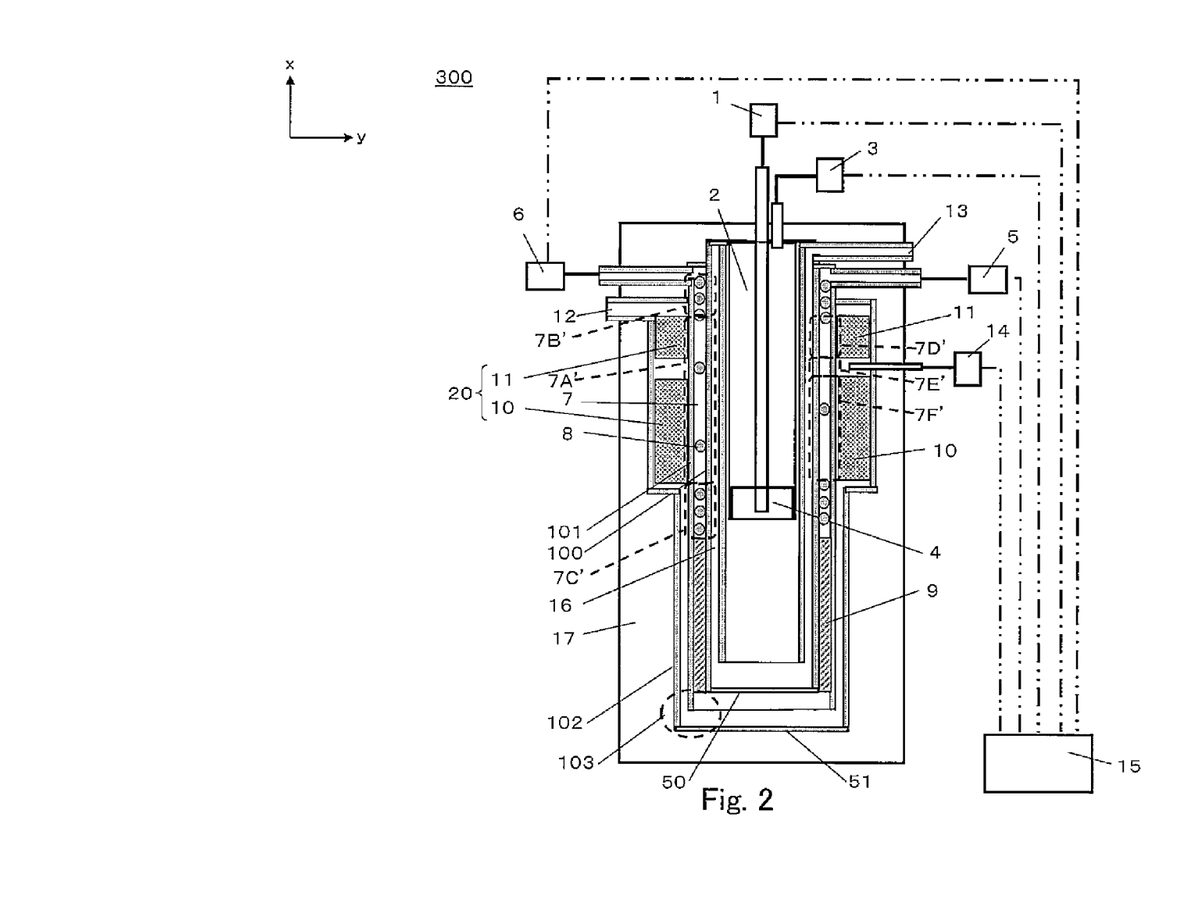
FIG. 2 is a schematic diagram showing an example of a schematic configuration of a hydrogen generation apparatus according to Embodiment 2.

FIG. 2 is a schematic diagram showing an example of a schematic configuration of a hydrogen generation apparatus according to Embodiment 2. In FIG. 2, the up-down direction (the vertical direction) is defined as an x-axis; the left-right direction is defined as a y-axis; and the direction perpendicular to the plane of the diagram is defined as a z-axis. The main axis of a cylinder 100 is parallel to the x-axis. Hereinafter, the term "outer side" refers to an outer side with respect to the main axis of the cylinder 100; the term "lower part" refers to a lower side with respect to the vertical direction; and the term "upper part" refers to an upper side with respect to the vertical direction.

As shown in FIG. 2, a hydrogen generation apparatus 300 according to Embodiment 2 includes: the evaporating part 7 configured to evaporate water of a fluid that contains a raw material gas and the water to transform the water into steam, the raw material gas and the water being raw materials for hydrogen; a reforming catalyst layer 9 (the reforming reaction part) connected to the downstream side of the evaporating part 7 and configured to be supplied from the evaporating part 7 with a fluid containing the raw material gas and the steam, the reforming catalyst layer 9 including a reforming reaction catalyst which causes a reforming reaction to progress between the raw material gas and the steam contained in the fluid; the carbon monoxide reducing part 20 provided downstream from the reforming catalyst layer 9 and including at least one of a shift conversion catalyst layer 10 (the shift reactor) and a selective oxidation catalyst layer 11 (the selective oxidation reactor), the shift conversion catalyst layer 10 including a shift reaction catalyst which causes a shift reaction to progress between carbon monoxide and water, the selective oxidation catalyst layer 11 causing a selective oxidation reaction to progress between carbon monoxide and oxygen; and the gas guiding part 21, disposed between the reforming catalyst layer 9 and the carbon monoxide reducing part 20, which guides a gas that has passed through the reforming catalyst layer 9 to the carbon monoxide reducing part 20. The evaporating part 7 and the carbon monoxide reducing part 20 are arranged to be adjacent to each other such that, at least, a part of the evaporating part 7 and a part of the carbon monoxide reducing part 20 can exchange heat with each other. The evaporating part 7 is configured such that a heat exchange amount at a portion of the evaporating part 7, the portion corresponding to the carbon monoxide reducing part 20, is less than a heat exchange amount at each of portions of the evaporating part 7, the portions not corresponding to the carbon monoxide reducing part 20.

The hydrogen generation apparatus 300 according to Embodiment 2 includes: the cylinder 100 (a first cylinder) with a first bottom face 50 formed at one end of the cylinder 100; a cylinder 101 (a second cylinder) formed at the outer side of the cylinder 100; a casing 102 (a third cylinder) with a third bottom face 51, the casing 102 being formed at the outer side of the cylinder 101; a raw material gas supply unit 5 (a raw material supply unit) configured to supply the raw material gas to first space which is space formed between the side wall of the cylinder 100 and the side wall of the cylinder 101; a water supply unit 6 configured to supply water to the first space; a burner 4, formed within the cylinder 100, configured to be supplied with a combustible gas and combustion air and to perform combustion; and a flue gas passage 16, formed at the inner side of the cylinder 100, through which a flue gas from the burner 4 flows.

The evaporating part 7 is formed in the first space, and is configured to transform the water into steam by absorbing heat from the flue gas.

The reforming catalyst layer 9 (the reforming reaction part) is disposed in the first space at a position downstream from the evaporating part 7.

The carbon monoxide reducing part 20 (the shift conversion catalyst layer 10 and the selective oxidation catalyst layer 11) is disposed in second space formed between the side wall of the cylinder 101 and the side wall of the casing 102.

The gas guiding part 103 is configured to cause a reformed gas from the first space to turn around at a position between the first bottom face 50 and the third bottom face 51, and to supply the reformed gas to the second space.

Of the evaporating part 7, the portion corresponding to the carbon monoxide reducing part 20 is a first evaporating portion 7A' formed between the carbon monoxide reducing part 20 and the cylinder 100. The heat exchange amount is the amount of heat exchanged between the evaporating part and the water supplied from the water supply unit.

The cylinder 100, the cylinder 101, and the casing 102 are formed such that their respective cross sections that are cut parallel to a Y-Z plane are round and concentric with each other. However, as an alternative, their cross sections may be in a different shape such as elliptic, rectangular, or polygonal. The first bottom face 50 fully closes one end (lower end) of the cylinder 100. Therefore, there is no such situation that a gas within the cylinder 100 leaks out through a gap between the first bottom face 50 and the cylinder 100. The third bottom face 51 fully closes one end (lower end) of the casing 102. Therefore, there is no such situation that a gas within the casing 102 leaks out through a gap between the third bottom face 51 and the casing 102. The first bottom face 50 and the third bottom face 51 are flat faces parallel to each other. One end (lower end) of the cylinder 101, the one end facing the third bottom face 51, is open.

In FIG. 2, the hydrogen generation apparatus 300 includes the burner 4 configured to mix a fuel gas supplied from a fuel gas supply unit 1 with air supplied from an air fan 3 and sent through an air passage 2, thereby forming a flame. A flue gas generated at the burner 4 flows through the flue gas passage 16 formed at the inner side of the cylinder 100, and is discharged to the outside of the apparatus through an exhaust outlet 13.

The evaporating part 7, which transforms the water supplied from the water supply unit 6 into steam, is provided at the outer side of the flue gas passage 16. The evaporating part 7 is configured as follows: a metal round bar 8 (a passage component), which is a spiral rod-like member and serves as a partition, is sandwiched between the cylinder 100 and the cylinder 101 and thereby space (a water passage) is formed between portions of the round bar; and the water is flowed through the space along the round bar 8. The evaporating part 7 is also supplied with the raw material gas from the raw material gas supply unit 5. Thus, the space within the evaporating part 7 is partitioned by the spiral round bar 8 such that the space is formed into a spiral passage, which extends downward and which winds around the outer periphery of the cylinder 100. That is, the evaporating part 7 includes a metal round bar 8, which is a passage component forming a part of the passage through which the raw material gas and water flow at the outer side of the flue gas passage 16. It is preferred that the round bar 8 is formed of a metal with a round cross section.

The round bar 8 herein is formed such that the spiral pitch (a distance between adjacent portions of the passage component) in the upstream portion of the evaporating part 7 (a second evaporating portion 7B') and the spiral pitch in the downstream portion of the evaporating part 7 (a third evaporating portion 7C') are smaller than the spiral pitch in the midstream portion of the evaporating part 7 (a portion different from the upstream and downstream portions, i.e., the first evaporating portion 7A'), the midstream portion corresponding to the carbon monoxide reducing part 20. In other words, one or a plurality of round bars are continuously arranged, such that the spiral pitch of the round bar(s) 8 is small in the upstream and downstream portions of the evaporating part 7 and great in the midstream portion different from the upstream and downstream portions. A mixed gas of the raw material and steam, which is sent out from the evaporating part 7, is supplied to the reforming catalyst layer 9 which is positioned at the outer side of the flue gas passage 16 and at a lower part below the evaporating part 7.

It should be noted that the terms upstream, midstream, and downstream refer to the upstream, midstream, and downstream with respect to the flow of gas.

The water passage is formed such that the cross section of the water passage (i.e., the area of a portion surrounded by adjacent portions of the round bar 8, the cylinder 100, and the cylinder 101 in FIG. 2) is greater in the first evaporating portion 7A' than in the second evaporating portion 7B' and the third evaporating portion 7C'.

It is preferred that the evaporating part is configured such that the heat exchange amount decreases in the following order: the heat exchange amount at the second evaporating portion 7B'; the heat exchange amount at the third evaporating portion 7C'; and the heat exchange amount at the first evaporating portion 7A'. The heat exchange amount can be adjusted by adjusting, for example, the spiral pitch (the greater the spiral pitch, the less the heat exchange amount) and the cross section of the water passage (the greater the cross section, the less the heat exchange amount).

It is preferred that the distance between adjacent portions of the passage component (i.e., the spiral pitch of the round bar 8) increases in the following order: the spiral pitch in the second evaporating portion 7B'; the spiral pitch in the third evaporating portion 7C'; and the spiral pitch in the first evaporating portion 7A'.

In FIG. 1, neither the second evaporating portion 7B' nor the third evaporating portion 7C' overlaps with the carbon monoxide reducing part 20 in the direction along the YZ plane. However, as an alternative, a part of the second evaporating portion 7B' and a part of the third evaporating portion 7C' may overlap with the carbon monoxide reducing part 20 in the direction along the YZ plane.

The raw material supplied from the raw material gas supply unit 5, and the water supplied from the water supply unit 6, flow in the downward vertical direction between the cylinder 100 and the cylinder 101. A gas discharged from the reforming catalyst layer 9 flows through the opening at the lower end of the cylinder 101, collides against the third bottom face 51, flows to the outer side with respect to the main axis of the cylinder 101, and then flows in the upward vertical direction between the cylinder 101 and the casing 102.

In the above description, the raw material gas from the raw material gas supply unit 5 is supplied to the evaporating part 7. Then, the raw material gas is flowed together with water within the evaporating part 7, and thereby a mixed gas is obtained. However, as an alternative, the raw material gas may be supplied to steam sent out from the evaporating part 7 to obtain a mixed gas, and the mixed gas may be supplied to the reforming catalyst layer 9.

Further, in order to effectively use, within the apparatus, the combustion heat generated at the burner 4 and the reaction heat of the catalysts, the entire apparatus may be covered with a heat insulating material 17.

The reformed gas sent out from the reforming catalyst layer 9 is supplied to the shift conversion catalyst layer 10 disposed at the outer side of the evaporating part 7. A converted gas sent out from the shift conversion catalyst layer 10 is, after being mixed with air from a selective oxidation air supply unit 14, supplied to the selective oxidation catalyst layer 11 which is positioned at the outer side of the evaporating part 7 and at an upper part above the shift conversion catalyst layer 10. Then, a resultant generated gas that comes out of the selective oxidation catalyst layer 11 is sent out from the hydrogen generation apparatus 300 through a generated gas outlet 12 as a generated gas, the carbon monoxide concentration of which is no higher than 10 ppm and the hydrogen concentration of which is high. The shift conversion catalyst layer 10 is supplied with the reformed gas and reduces carbon monoxide in the reformed gas through a shift reaction by the shift conversion catalyst. The selective oxidation catalyst layer 11 receives the converted gas which flows from the shift conversion catalyst layer 10, and also receives the supply of air which acts as an oxidant. The selective oxidation catalyst layer 11 reduces carbon monoxide in the converted gas by means of the selective oxidation catalyst. Although the shift conversion catalyst layer 10 and the selective oxidation catalyst layer 11 are collectively referred to as the carbon monoxide reducing part 20, the carbon monoxide reducing part 20 may include only one of the shift conversion catalyst layer 10 and the selective oxidation catalyst layer 11.

Here, the fuel gas and air supplied to the burner 4, the raw material gas and water supplied to the evaporating part 7, and the selective oxidation air supplied to the converted gas from the shift conversion catalyst layer 10 can be controlled by the fuel gas supply unit 1, the air fan 3, the raw material gas supply unit 5, the water supply unit 6, and the selective oxidation air supply unit 14, based on signals from a controller 15.

It should be noted that the fuel gas supply unit 1, the air fan 3, the raw material gas supply unit 5, the water supply unit 6, and the selective oxidation air supply unit 14 are configured to adjust the flow rate of their respective supplies (i.e., the fuel gas, the raw material gas, water, a combustible gas such as an off gas, and air). Here, a component serving to adjust the flow rate may be a supply pump (driving means) capable of changing the discharge flow rate of a supply, or may be a fluid control mechanism which is a combination of the source of a supply and a flow rate adjusting valve that is provided at a downstream passage and configured to adjust the flow rate of the supply.

Next, operations of respective components of the hydrogen generation apparatus 300 with the above-described configuration are described.

In the burner 4, the fuel gas and air are mixed, and a resultant mixed gas is subjected to high-voltage electric discharge (which is not shown). In this manner, a flame is formed and a high-temperature flue gas is generated, which is then supplied to the flue gas passage 16.

The evaporating part 7 supplied with the water and the raw material evaporates the water mainly by means of combustion heat directly or indirectly supplied from the flue gas in the flue gas passage 16, the flue gas flowing through the inner side of the evaporating part 7, and reaction heat supplied from the catalysts, and at the same time, the evaporated water is mixed with the raw material gas that flows in the same passage in the evaporating part 7 and a resultant mixed gas is supplied to the reforming catalyst layer 9. The temperature of the reforming catalyst layer 9 is increased (in general, 600 to 700° C.) by the flue gas, which is a high-temperature gas flowing through the inner side of the reforming catalyst layer 9. By being supplied with the mixed gas of the raw material gas and steam, the reforming catalyst layer 9 generates, through a steam reforming reaction, a reformed gas containing hydrogen, carbon monoxide, and carbon dioxide.

The shift conversion catalyst layer 10 is maintained at an optimal temperature (150 to 300° C.) for a shift reaction by means of heat exchange with the inner adjacent evaporating part 7 via the side wall of the cylinder 101. The shift conversion catalyst layer 10 transforms high-concentration carbon monoxide (10 to 15%) in the reformed gas into carbon dioxide, thereby reducing the concentration of carbon monoxide (to approximately 0.5%). The selective oxidation catalyst layer 11 is also maintained at an optimal temperature (approximately 150° C.) for a selective oxidation reaction by means of heat exchange with the inner adjacent evaporating part 7 via the side wall of the cylinder 101. In the selective oxidation catalyst layer 11, a converted gas is mixed with air from the selective oxidation air supply unit 14, and through the selective oxidation reaction, the concentration of carbon monoxide in the converted gas is reduced to an extremely low concentration which is lower than or equal to 10 ppm.

If an operation load on the hydrogen generation apparatus 300 (i.e., the amount of hydrogen to be generated) is changed, then the controller 15 changes a supply condition so that the supply condition will suit the operation load. For example, if a command is received and the command instructs to change the supply condition from a condition for generating hydrogen in an amount that is 50 percent of a rated condition (output 50%) (TDR 50) to a condition for generating hydrogen in an amount corresponding to the rated condition (output 100%) (TDR 100), then the raw material gas supply unit 5, the water supply unit 6, and the selective oxidation air supply unit 14 are controlled by signals from the controller 15, so that a raw material gas amount, a water supply amount, and a selective oxidation air amount are increased.

At the time, in the evaporating part 7, the amount of water supply is increased from the amount of water supply necessary for the condition of TDR 50 to the amount of water supply necessary for TDR 100. Generally speaking, the amount of water necessary for TDR 100 (e.g., 10 g/min) is approximately twice the amount of water necessary for TDR 50 (e.g., 5 g/min). Accordingly, a point at which the evaporation becomes completed in the evaporating part 7 shifts toward the downstream side in the case of TDR 100.

Specifically, in the case of TDR 50, water at a room temperature (approximately 20° C.) supplied from the water supply unit 6 enters the evaporating part 7, and then the temperature of the water is increased as a result that the water receives heat from an exhaust gas flowing through the flue gas passage 16, heat from the selective oxidation catalyst layer 11, and heat from the shift conversion catalyst layer 10. In the midstream portion of a sixth evaporating portion 7F' corresponding to the shift conversion catalyst layer 10, the evaporation of the water becomes fully completed and the water transforms into steam, the temperature of which is 100° C. or higher.

However, in the case of TDR 100 which requires twice the amount of water, the evaporation of the water is not yet completed and the water is in a gas-liquid two-phase state at 100° C. in the midstream portion of the sixth evaporating portion 7F' corresponding to the shift conversion catalyst layer 10. The water further flows downstream and receives heat from the shift conversion catalyst layer and flue gas. As a result, the evaporation becomes completed in the downstream portion of the sixth evaporating portion 7F' or at a further downstream position.

At the time, since the reforming catalyst layer 9 is positioned downstream from the evaporating part 7, if the evaporation completion point shifts toward the downstream side to be out of the evaporating part 7, then the evaporation becomes completed in the reforming catalyst layer 9. At the time, water in liquid form, the temperature of which is 100° C., is supplied to the reforming catalyst layer 9. Since the evaporation requires latent heat, there is a possibility that a large amount of heat is taken from the catalyst around a position where the evaporation occurs and the temperature of the catalyst may become 100° C. Particularly, if the evaporation completion point is positioned in the midstream portion of the sixth evaporating portion 7F' as in the case of TDR 50, the water is already in the form of steam in the midstream portion, and the temperature of the steam easily increases at a position downstream from the midstream portion. Accordingly, the upstream portion of the reforming catalyst layer 9 is in a high-temperature state of 400° C. From this state, if the supply condition is changed to TDR 100, the catalyst temperature may locally decrease from 400° C. to 100° C., and such a local decrease in the catalyst temperature causes a temperature decrease of the catalyst nearby, leading to a temperature decrease of the entire catalyst layer. In such a case, the reaction catalyzed by the catalyst does not sufficiently occur, which results in a decrease in the amount of hydrogen generation and/or unstable hydrogen generation amount. Moreover, the local temperature decrease may cause local thermal contraction in the reforming catalyst layer, which may result in the occurrence of cracks.

If the efficiency of a hydrogen generation apparatus is high, hydrogen can be generated with less energy. Such an efficient hydrogen generation apparatus is highly valued. In order to realize a highly efficient hydrogen generation apparatus, it is necessary to minimize thermal losses from the apparatus. One of the thermal losses is one that is caused when the generated gas and flue gas sent out from the hydrogen generation apparatus take heat from the apparatus.

As described above with reference to FIG. 7, more favorable catalyst characteristics can be obtained by reducing the amount of heat exchanged by the catalyst and narrowing the range of catalyst temperature. In this manner, the catalyst performance can be stabilized. However, with such a configuration of the water evaporating part in which the heat exchange amount is reduced, if heat exchange is performed with the generated gas from the carbon monoxide reducing part and with the flue gas, then the amount of heat exchanged with the generated gas and flue gas is insufficient and these gases with a large amount of heat are sent out from the hydrogen generation apparatus. That is, a large amount of heat is released to the outside of the apparatus. Such a hydrogen generation apparatus is an inefficient apparatus with great thermal loss that is caused by discharged gases. On the other hand, if the length of a heat exchanging part is made long to increase the heat exchange amount, then the hydrogen generation apparatus becomes large-sized. Accordingly, there is a possibility that heat radiation from the surface of the apparatus increases, which results in a decrease in the efficiency of the apparatus. In addition, when the size of the apparatus increases, the amount of materials used for fabricating the apparatus also increases, which causes an increase in cost and thereby results in a decrease in the value of the apparatus.

In the present embodiment, in order to facilitate heat transfer at the upstream portion and the downstream portion of the evaporating part 7 for the purpose of eliminating the above-described performance instability and realizing efficiency improvement, the example in FIG. 2 shows that the pitch of the spiral round bar 8 is smaller in each of the upstream portion and the downstream portion of the evaporating part 7 than in portions other than the upstream and downstream portions of the evaporating part 7. By reducing the pitch in the upstream and downstream portions of the evaporating part 7 in such a manner, a time over which the water flows along the spiral round bar 8 is lengthened in the upstream and downstream portions of the evaporating part 7.

In other words, a time that the water takes to flow through the upstream portion of the evaporating part 7 (i.e., staying time), and a time that the water takes to flow through the downstream portion of the evaporating part 7 (i.e., staying time), become long in accordance with an increase in the length of the spiral passage in the upstream portion of the evaporating part 7 and an increase in the length of the spiral passage in the downstream portion of the evaporating part 7, respectively. Accordingly, the amount of heat that the upstream portion of the evaporating part 7 exchanges with its corresponding (adjacent) portions (i.e., the downstream side passage of the carbon monoxide reducing part 20 and the flue gas passage 16) at the inner and outer sides of the evaporating part 7 is great. Similarly, the amount of heat that the downstream portion of the evaporating part 7 exchanges with its corresponding portions (i.e., the upstream side passage of the carbon monoxide reducing part 20 and the flue gas passage 16) at the inner and outer sides of the evaporating part 7 is great. Since these heat exchange amounts are great, the heat from the generated gas and flue gas, which are to be discharged from the hydrogen generation apparatus 300, can be recovered, and these gases can be discharged after the temperature of the gases is reduced. Also, since the water is fully evaporated in the evaporating part 7, droplets are prevented from being supplied to the reforming catalyst layer 9.

At the midstream portion of the evaporating part 7, the evaporating part 7 exchanges heat, via the side wall of the cylinder 101, with a large part of the outer adjacent catalyst layers of the carbon monoxide reducing part 20. The pitch of the spiral round bar 8 in the midstream portion of the evaporating part 7 is set to be great in order to minimize a temperature gradient in the catalyst layers of the carbon monoxide reducing part 20. By setting the pitch to be great, a time that the water takes to flow through the midstream portion of the evaporating part 7 (i.e., staying time) becomes short, and the amount of heat exchanged with the shift conversion catalyst layer 10 and the selective oxidation catalyst layer 11, which form the carbon monoxide reducing part, becomes small. In this manner, the amount of heat taken from a gas while the gas flows through the catalyst layers is reduced and a temperature decrease is suppressed, and thereby the temperature of the overall catalyst layers is made as uniform as possible so that favorable catalyst characteristics can be obtained.

Generally speaking, water does not entirely fill the water passage, which is formed with the round bar 8, the cylinder 100, and the cylinder 101. Accordingly, if the pitch of the round bar 8 is increased, then empty space within the evaporating part 7 other than water in liquid form becomes larger, which results in a decrease in the proportion of the water in liquid form per unit volume. Accordingly, the amount of heat to be absorbed when the water in liquid form evaporates is reduced. This is another reason for the heat exchange amount to decrease when the pitch of the round bar 8 is increased.

As described above, with the simple configuration of the water evaporating part, the catalyst temperature is made uniform and stabilized, and in addition, the amount of heat that can be utilized within the hydrogen generation apparatus 300 is increased. Thus, the efficiency of the apparatus can be improved and the performance of the apparatus can be stabilized.

It should be noted that a suitable positional relationship between the carbon monoxide reducing part disposed at the outer side of the evaporating part 7, and the upstream and downstream portions of the evaporating part 7 with a small pitch of the spiral round bar 8, is as follows: the selective oxidation catalyst layer 11 (or the shift conversion catalyst layer 10 in a case where the carbon monoxide reducing part includes only the shift conversion catalyst layer 10) is disposed adjacent to the midstream portion between the upstream and downstream portions of the evaporating part 7. In this case, heat exchange can be performed with least influence on the temperature of the catalyst layers.

If the heat exchange amount at the upstream portion of the evaporating part 7 is excessively great, the temperature of the generated gas (the gas that flows through the side downstream from the reforming catalyst layer 9) and/or the flue gas may become lower than the dew point of steam contained in these gases. In this case, dew condensation of the steam in the generated gas and/or the flue gas occurs in the passage. If such dew condensation occurs, the condensation water flows and reaches a high-temperature portion in the passage. As a result, evaporation occurs again. At the time, heat is taken from a portion around a position where the evaporation occurs. This may result in that the temperature state in the hydrogen generation apparatus 300 is disturbed and the performance of the apparatus is disturbed. Therefore, a suitable configuration for the heat exchange (i.e., the pitch of the spiral round bar 8) is one that allows heat to be exchanged as much as possible without causing dew condensation.

It should be noted that the term, heat exchange amount, in the present embodiment refers to a heat exchange amount per unit area. To be more specific, the heat exchange amount may be considered as a heat exchange amount per unit area of the side wall of the cylinder 101, the heat exchange amount being the amount of heat exchanged, via a surface of the side wall of the cylinder 101, between the cylinder 101 and water (the water that flows between the cylinder 101 and the cylinder 100 through the passage formed by the round bar 8).

[Variations]

Figure 3:
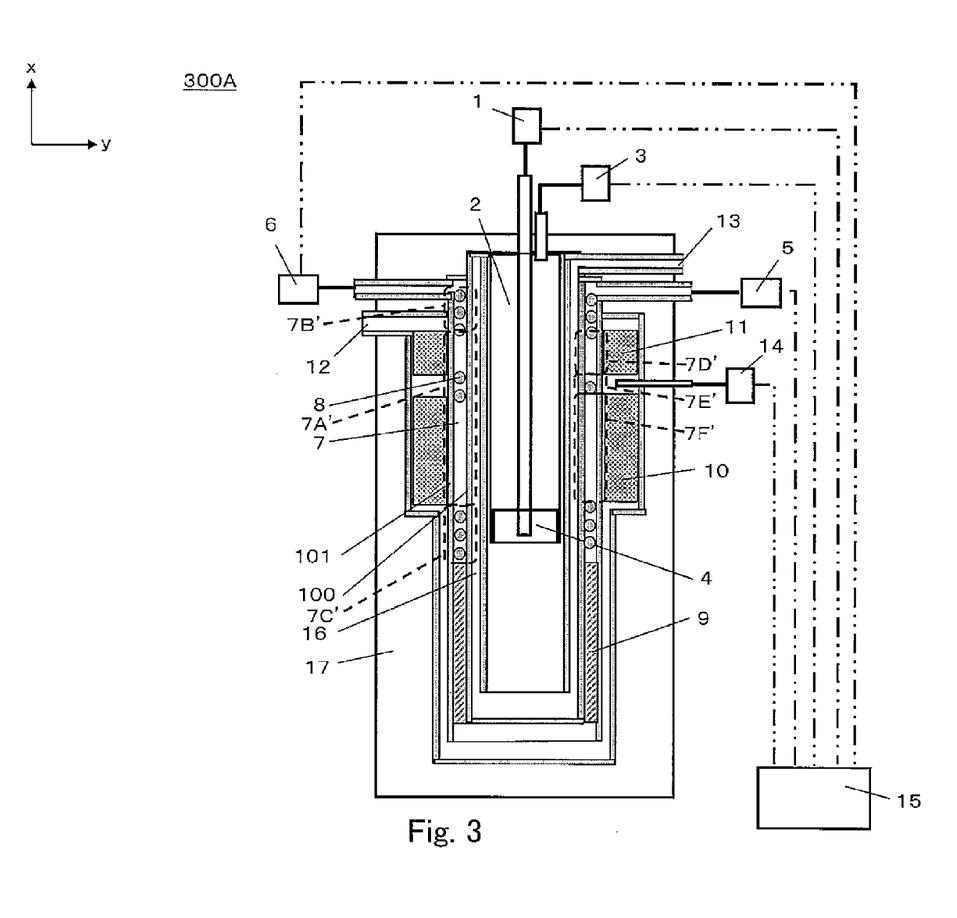
FIG. 3 is a schematic diagram showing an example of a schematic configuration of a hydrogen generation apparatus according to Variation 1 of Embodiment 2.

FIG. 3 is a schematic diagram showing an example of a schematic configuration of a hydrogen generation apparatus according to Variation 1 of Embodiment 2. The configuration of a hydrogen generation apparatus 300A according to Variation 1 is the same as that of the above-described hydrogen generation apparatus according to Embodiment 2, except for the configuration of the evaporating part. Therefore, the common components between Variation 1 and Embodiment 2 are denoted by the same reference signs and names, and the description of such components will be omitted. In Variation 1, the carbon monoxide reducing part 20 includes: the shift conversion catalyst layer 10 formed at the upstream side of the carbon monoxide reducing part 20; and the selective oxidation catalyst layer 11 formed at the downstream side of the carbon monoxide reducing part 20. The first evaporating portion 7A' includes: a fourth evaporating portion 7D' formed between the selective oxidation catalyst layer 11 and the cylinder 100; a sixth evaporating portion 7F' formed between the shift conversion catalyst layer 10 and the cylinder 100; and a fifth evaporating portion 7E' formed between the fourth evaporating portion 7D' and the sixth evaporating portion 7F'. The first evaporating portion 7A' is configured such that the heat exchange amount is less at the fourth evaporating portion 7D' and the sixth evaporating portion 7F' than at the fifth evaporating portion 7E'.

In Variation 1, it is preferred that the distance between adjacent portions of the passage component (i.e., the spiral pitch of the round bar 8) is greater in the fourth evaporating portion 7D' and the sixth evaporating portion 7F' than in the fifth evaporating portion 7E'.

In Variation 1, it is preferred that the evaporating part is configured such that the heat exchange amount decreases in the following order: the heat exchange amount at the second evaporating portion 7B'; the heat exchange amount at the third evaporating portion 7C'; the heat exchange amount at the fifth evaporating portion 7E'; the heat exchange amount at the fourth evaporating portion 7D'; and the heat exchange amount at the sixth evaporating portion 7F'. The heat exchange amount can be adjusted by adjusting, for example, the spiral pitch (the greater the spiral pitch, the less the heat exchange amount) and the cross section of the water passage (the greater the cross section, the less the heat exchange amount).

Figure 4:
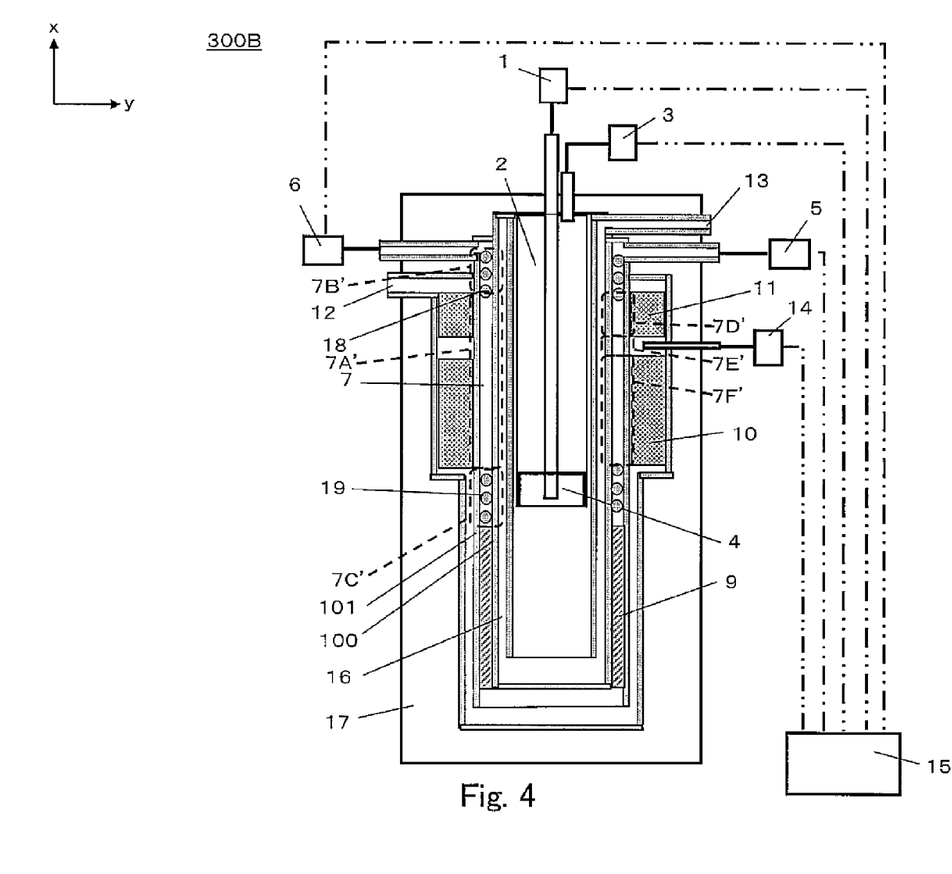
FIG. 4 is a schematic diagram showing an example of a schematic configuration of a hydrogen generation apparatus according to Variation 2 of Embodiment 2.

FIG. 4 is a schematic diagram showing an example of a schematic configuration of a hydrogen generation apparatus according to Variation 2 of Embodiment 2. The configuration of a hydrogen generation apparatus 300B according to Variation 2 is the same as that of the above-described hydrogen generation apparatus according to Embodiment 2, except for the configuration of the evaporating part. Therefore, the common components between Variation 2 and Embodiment 2 are denoted by the same reference signs and names, and the description of such components will be omitted. In Variation 2, the round bar 8 (the passage component) is not disposed in the first evaporating portion 7A'.

Figure 5A:
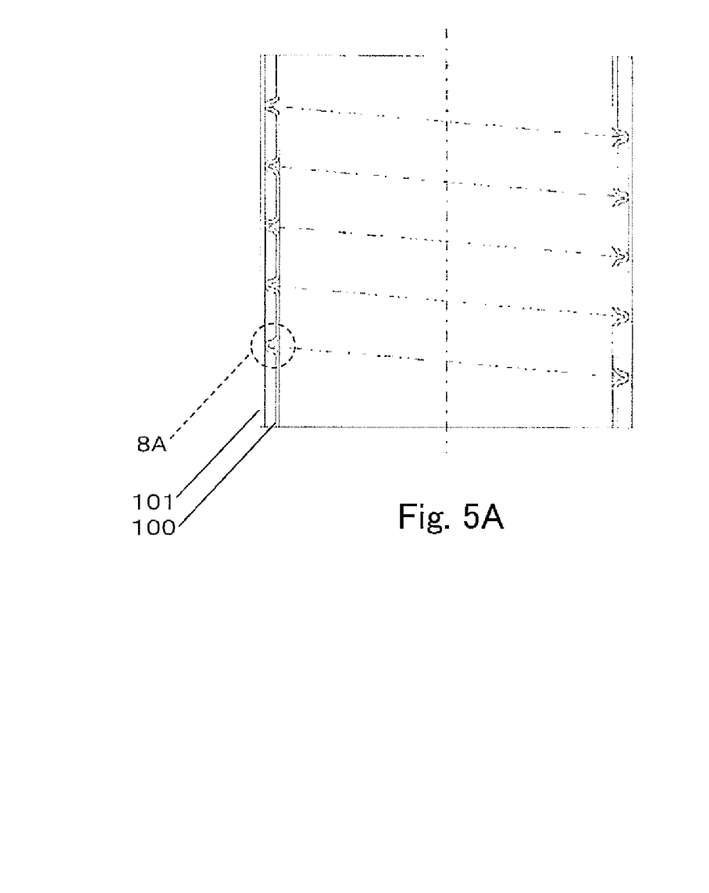
FIGS. 5A and 5B are cross-sectional views each showing an example of a schematic configuration of a water passage in a hydrogen generation apparatus according to a corresponding variation of Embodiment 2.
Figure 5B:
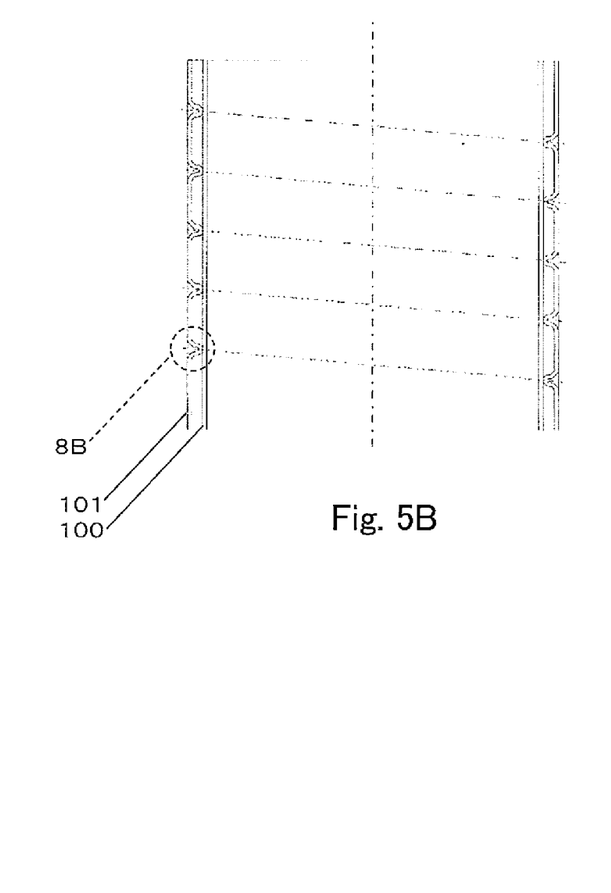

The passage component need not be the round bar 8. For example, the passage component may be formed by forming the side wall of the cylinder 100 or the side wall of the cylinder 101 such that a spiral ridge protrudes from the side wall. FIGS. 5A and 5B are cross-sectional views each showing an example of a schematic configuration of a water passage in a hydrogen generation apparatus according to a corresponding variation of Embodiment 2; and FIG. 5A shows Variation 3 and FIG. 5B shows Variation 4.

In Variation 3 shown in FIG. 5A, a passage component 8A is formed by shaping the side wall of the cylinder 100 such that a spiral ridge protrudes from the side wall of the cylinder 100 toward the cylinder 101. In Variation 4 shown in FIG. 5B, a passage component 8B is formed by shaping the side wall of the cylinder 101 such that a spiral ridge protrudes from the side wall of the cylinder 101 toward the cylinder 100.

Embodiment 3

A fuel cell power generation system according to Embodiment 3 includes: the hydrogen generation apparatus according to any one of Embodiment 1, Embodiment 2, and their variations; and a fuel cell configured to generate electric power by utilizing the generated gas (hydrogen-containing gas) discharged from the hydrogen generation apparatus.

Figure 6:
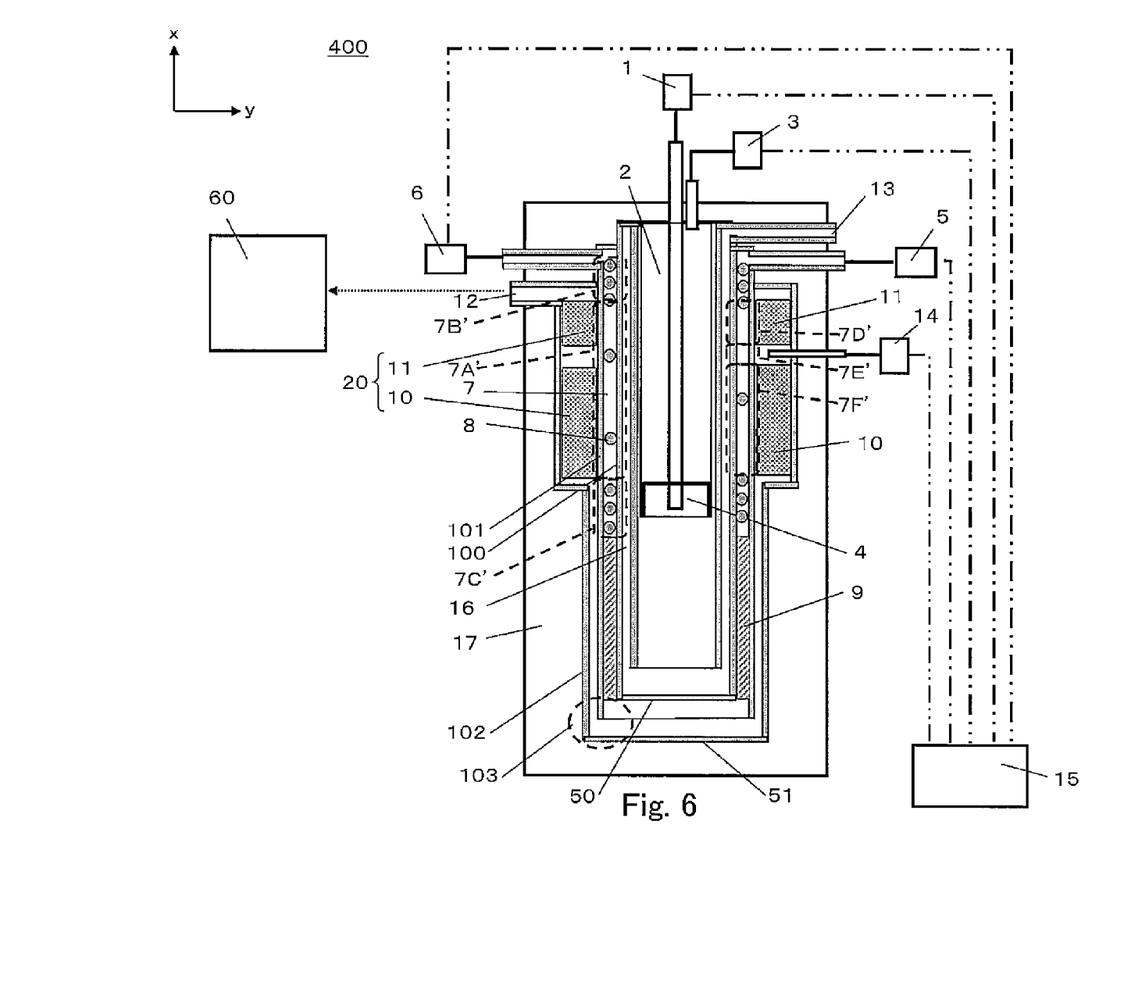
FIG. 6 is a schematic diagram showing an example of a schematic configuration of a fuel cell power generation system according to Embodiment 3

FIG. 6 is a schematic diagram showing an example of a schematic configuration of the fuel cell power generation system according to Embodiment 3. A fuel cell power generation system 400 illustratively shown in FIG. 6 is a result of adding a fuel cell 60 to the hydrogen generation apparatus 300 (FIG. 2) according to Embodiment 2. Other than the addition of the fuel cell 60, the configuration of the fuel cell power generation system 400 is the same as that of the hydrogen generation apparatus 300. Therefore, the common components between FIG. 2 and FIG. 6 are denoted by the same reference signs and names, and the description of such components will be omitted.

The fuel cell 60 generates electric power by utilizing the generated gas (hydrogen-containing gas) discharged from the hydrogen generation apparatus 300. Examples of the fuel cell 60 include a polymer electrolyte fuel cell (PEFC) and a solid oxide fuel cell (SOFC).

The anode of the fuel cell is connected to the generated gas outlet 12, and the hydrogen-containing gas discharged from the generated gas outlet 12 is supplied to the anode of the fuel cell.

INDUSTRIAL APPLICABILITY

The present invention makes it possible to provide a highly reliable hydrogen generation apparatus and a highly reliable fuel cell power generation system that are capable of generating hydrogen more stably and reducing carbon monoxide production more assuredly.

REFERENCE SIGNS LIST

1 fuel gas supply unit
2 air passage
3 air fan
4 burner
5 raw material gas supply unit
6 water supply unit
7 evaporating part
7A portion corresponding to a carbon monoxide reducing part
7B portion not corresponding to the carbon monoxide reducing part
7A' first evaporating portion
7B' second evaporating portion
7C' third evaporating portion
7D' fourth evaporating portion
7E' fifth evaporating portion
7F' sixth evaporating portion
8 round bar
8A passage component
8B passage component
9 reforming catalyst layer
9A reforming reaction part
10 shift conversion catalyst layer
11 selective oxidation catalyst layer
12 generated gas outlet
13 exhaust outlet
14 selective oxidation air supply unit
15 controller
16 flue gas passage
17 heat insulating material
20 carbon monoxide reducing part
21 gas guiding part
22 partition wall
23 partition wall
50 first bottom face
51 third bottom face
60 fuel cell
100 cylinder
101 cylinder
102 casing
103 gas guiding part
200 hydrogen generation apparatus
300 hydrogen generation apparatus
400 fuel cell power generation system

The invention claimed is:

1. A hydrogen generation apparatus comprising:
an evaporating part configured to evaporate water of a fluid that contains a raw material gas and the water to transform the water into steam, the raw material gas and the water being raw materials for hydrogen;
a reforming reaction part connected to a downstream side of the evaporating part and configured to be supplied from the evaporating part with a fluid containing the raw material gas and the steam, the reforming reaction part including a reforming reaction catalyst which causes a reforming reaction to progress between the raw material gas and the steam contained in the fluid;
a carbon monoxide reducing part provided downstream from the reforming reaction part and including at least one of a shift reactor and a selective oxidation reactor, the shift reactor including a shift reaction catalyst which causes a shift reaction to progress between carbon monoxide and water, the selective oxidation reactor causing a selective oxidation reaction to progress between carbon monoxide and oxygen;
a burner configured to heat at least the reforming reaction part and the carbon monoxide reducing part by performing combustion; and
a gas guiding part disposed between the reforming reaction part and the carbon monoxide reducing part and configured to guide a gas that has passed through the reforming reaction part to the carbon monoxide reducing part by causing the gas to turn around, wherein
the evaporating part and the carbon monoxide reducing part are arranged to be adjacent to each other such that, at least, a part of the evaporating part and a part of the carbon monoxide reducing part are heat exchangeable with each other, and
the evaporating part includes: a first evaporating portion which corresponds to the carbon monoxide reducing part; and a second evaporating portion which does not correspond to the carbon monoxide reducing part and which is formed upstream from the first evaporating portion, the evaporating part being configured such that a heat exchange amount between the first evaporating portion and water su lied from the water supply unit is less than a heat exchange amount between the second evaporating portion and the water supplied from the water supply unit.

2. The hydrogen generation apparatus according to claim 1, comprising:
a first cylinder with a first bottom face formed at one end of the first cylinder;
a second cylinder formed at an outer side of the first cylinder;
a third cylinder with a third bottom face, the third cylinder being formed at an outer side of the second cylinder;
a raw material supply unit configured to supply the raw material gas to first space which is space formed between a side wall of the first cylinder and a side wall of the second cylinder;
the water supply unit configured to supply the water to the first space;
the burner, formed within the first cylinder, configured to be supplied with a combustible gas and combustion air and to perform combustion; and
a flue gas passage, formed at an inner side of the first cylinder, through which a flue gas from the burner flows, wherein
the evaporating part is formed in the first space, and is configured to transform the water into steam by absorbing heat from the flue gas,
the reforming reaction part is disposed in the first space at a position downstream from the evaporating part,
the carbon monoxide reducing part is disposed in second space formed between the side wall of the second cylinder and a side wall of the third cylinder,
the gas guiding part is configured to cause the reformed gas from the first space to turn around at a position between the first bottom face and the third bottom face, and to supply the reformed gas to the second space, and
the first evaporating portion is formed between the carbon monoxide reducing part and the first cylinder.

3. The hydrogen generation apparatus according to claim 2, wherein
the evaporating part includes a water passage which is formed by partitioning by a passage component, and
a distance between adjacent portions of the passage component is greater in the first evaporating portion than in other portions different from the first evaporating portion.

4. The hydrogen generation apparatus according to claim 2, wherein
the evaporating part includes the first evaporating portion, the second evaporating portion, and a third evaporating portion which does not correspond to the carbon monoxide reducing part and which is formed downstream from the first evaporating portion, and
the evaporating part is configured such that the heat exchange amount decreases in the following order: the heat exchange amount at the second evaporating portion; the heat exchange amount at the third evaporating portion; and the heat exchange amount at the first evaporating portion.

5. The hydrogen generation apparatus according to claim 4, wherein
the evaporating part includes a water passage which is formed by partitioning by a passage component, and
a distance between adjacent portions of the passage component increases in the following order: the distance in the second evaporating portion; the distance in the third evaporating portion; and the distance in the first evaporating portion.

6. The hydrogen generation apparatus according to claim 2, wherein
the carbon monoxide reducing part includes:
a shift conversion catalyst layer formed at an upstream side of the carbon monoxide reducing part; and
a selective oxidation catalyst layer formed at a downstream side of the carbon monoxide reducing part,
the first evaporating portion includes:
a fourth evaporating portion formed between the selective oxidation catalyst layer and the first cylinder;
a sixth evaporating portion formed between the shift conversion catalyst layer and the first cylinder; and
a fifth evaporating portion formed between the upstream evaporating portion and the downstream evaporating portion, and
the first evaporating portion is configured such that the heat exchange amount is less at the fourth evaporating portion and the sixth evaporating portion than at the fifth evaporating portion.

7. The hydrogen generation apparatus according to claim 6, the evaporating part includes a water passage which is formed by partitioning by a passage component, and
a distance between adjacent portions of the passage component is greater in the fourth evaporating portion and the sixth evaporating portion than in the fifth evaporating portion.

8. The hydrogen generation apparatus according to claim 6, wherein
the evaporating part includes the first evaporating portion, a second evaporating portion formed upstream from the first evaporating portion, and a third evaporating portion formed downstream from the first evaporating portion, and
the evaporating part is configured such that the heat exchange amount decreases in the following order: the heat exchange amount at the second evaporating portion; the heat exchange amount at the third evaporating portion; the heat exchange amount at the fifth evaporating portion; the heat exchange amount at the fourth evaporating portion; and the heat exchange amount at the sixth evaporating portion.

9. The hydrogen generation apparatus according to claim 2, wherein
the evaporating part includes a water passage which is formed by partitioning by a passage component, and the passage component is not disposed in the first evaporating portion.

10. The hydrogen generation apparatus according to claim 3, wherein the passage component is sandwiched between the first cylinder and the second cylinder, and is a spiral rod-like member.

11. The hydrogen generation apparatus according to claim 3, wherein the passage component is formed of a metal with a round cross section.

12. The hydrogen generation apparatus according to claim 2, wherein
the evaporating part includes a water passage which is formed by partitioning by a passage component, and
the water passage has a greater cross section in the first evaporating portion than in other portions different from the first evaporating portion.

13. A fuel cell power generation system comprising: the hydrogen generation apparatus according to claim 1; and a fuel cell.

* * * * *